United States Patent [19]

Schwanke

[11] Patent Number: 4,642,777
[45] Date of Patent: Feb. 10, 1987

[54] METHOD AND APPARATUS FOR MICROWAVE DETERMINATION OF LIQUID RATE-OF-RISE USING DOPPLER DETECTION

[75] Inventor: Lavern H. Schwanke, Stromsville, Ohio

[73] Assignee: Foseco International Limited, Birmingham, England

[21] Appl. No.: 643,258

[22] Filed: Apr. 12, 1984

[51] Int. Cl.$^4$ .................. G06G 7/57; G01S 13/26; G01S 13/08; G01R 27/04
[52] U.S. Cl. .................... 364/476; 364/510; 324/58.5 B; 342/124; 342/109
[58] Field of Search ............... 364/200, 900, 472, 476, 364/510, 556, 564; 73/290 R, 290 V, 861.08; 343/5 NA, 7 ED, 8, 12 R, 14, 17.7, 719; 324/58.5 B

[56] References Cited

U.S. PATENT DOCUMENTS

| | | | |
|---|---|---|---|
| 4,019,562 | 4/1977 | Shiraiwa et al. | 164/155 |
| 4,044,353 | 8/1977 | Levy | 343/12 R |
| 4,044,355 | 8/1977 | Edwardsson | 343/14 |
| 4,167,736 | 9/1979 | Tomlinson | 343/5 NA |
| 4,205,315 | 5/1980 | Fleenor | 343/14 |
| 4,210,023 | 7/1980 | Sakamoto et al. | 364/14 |
| 4,219,814 | 8/1980 | Johnson | 343/12 R |
| 4,281,285 | 7/1981 | Basttda | 324/58.5 B |
| 4,359,902 | 11/1982 | Lawless | 343/14 |
| 4,367,473 | 1/1983 | Marin et al. | 343/17.7 |
| 4,425,793 | 1/1984 | Turton | 73/290 R |
| 4,458,530 | 7/1984 | Basttda | 343/14 |
| 4,470,445 | 9/1984 | Mangan et al. | 164/156 |
| 4,484,133 | 11/1984 | Riggin | 324/58.5 B |
| 4,566,321 | 1/1986 | Zacchio | 343/12 R |
| 4,597,048 | 6/1986 | Mazur et al. | 364/476 |

*Primary Examiner*—Jerry Smith
*Assistant Examiner*—Jon D. Grossman
*Attorney, Agent, or Firm*—Nixon & Vanderhye

[57] ABSTRACT

A method and apparatus provide for the determination of the rate-of-rise of the level of a liquid, such as molten metal in a mold, in a reliable, accurate, and flexible manner. Molten metal passes from a container through an adjustable valve in an orifice to a mold. A microwave generator is connected to a microwave antenna located above the mold for transmitting microwaves to the surface of the molten metal in the mold. A mixer/detector is operatively connected to the antenna, and a computer is operatively connected to the mixer/detector. The computer processes the mixed signal received from the mixer/detector after it is converted to a digital signal. This digital signal is responsive to the Doppler signal caused by change in the level of the metal in the mold. The rate-of-rise of the surface of the molten metal is calculated in response to the digital signal, and is displayed on a monitor. The slide gate is controlled to adjust the amount of molten metal flowing from the container to the mold to achieve a desired rate-of-rise. The computer uses various techniques, such as calculating rolling averages and optimizing maxima-to-maxima and minima-to-minima time interval calculations, to improve reliability in the presence of noise, spurious multiple reflections, and disturbances in the molten metal surface.

46 Claims, 6 Drawing Figures

FIG. 3

| A | B | C1 | C2 | D1 | D2 |
|---|---|---|---|---|---|
| 13.80 | 8.18 | 4.0 | 18.4 | 4.19 | 4.63 |
| 14.80 | 7.48 | 4.4 | 16.1 | 4.57 | 4.40 |
| 15.80 | 8.24 | 3.7 | 10.8 | 4.16 | 4.46 |
| 16.75 | 7.34 | 5.2 | 15.1 | 4.51 | 4.43 |
| 17.79 | 7.96 | 12.0 | 27.2 | 4.49 | 4.50 |
| 18.79 | 7.11 | 12.3 | 22.1 | 4.54 | 4.47 |
| 19.76 | 7.79 | 18.6 | 30.1 | 4.45 | 4.46 |
| 20.77 | 8.00 | 20.0 | 29.0 | 4.32 | 4.25 |
| 21.72 | 6.87 | 6.6 | 22.5 | 4.01 | 4.15 |
| 22.75 | 8.04 | 7.2 | 21.7 | 4.51 | 4.22 |
| 23.71 | 8.39 | 17.0 | 29.5 | 4.23 | 4.33 |
| 24.69 | 7.85 | 17.4 | 30.9 | 4.15 | 4.10 |
| 25.68 | 8.38 | 15.1 | 25.9 | 4.09 | 4.05 |
| 26.63 | 4.77 | 10.2 | 26.1 | 5.97 | 6.09 |
| 27.63 | 5.46 | 5.5 | 13.6 | 6.65 | 6.53 |
| 28.61 | 19.54 | 4.0 | 14.6 | 5.17 | 5.09 |
| 29.59 | 6.19 | 3.5 | 8.9 | 3.93 | 4.49 |
| 30.56 | 7.49 | 3.7 | 13.0 | 4.85 | 4.81 |

4,642,777

METHOD AND APPARATUS FOR MICROWAVE DETERMINATION OF LIQUID RATE-OF-RISE USING DOPPLER DETECTION

BACKGROUND AND SUMMARY OF INVENTION

In the utilization of metal casting apparatus, it is necesary—for effective operation—to detect the rising speed of molten metal within a mold, and to adjust the rate-of-rise so that a desired rate is achieved.

Conventionally the rate-of-rise of molten metal in a mold is determined by an operator measuring the elapsed time between level marks on a container for the molten metal, as visually observed by the operator, or by timing between electrical contacts of the molten metal with a wire or wires maintained at known levels within the container. Such methods are often inaccurate due to the lack of precision inherent in such observations, and due to the inability to produce continuous and timely information which can be acted upon either manually or automatically to control the rate-of-rise as desired.

In U.S. Pat. No. 4,019,562, a proposal is made for the automatic control of the rate of increase of the level of molten metal within a mold utilizing a generator for generating a microwave Doppler signal, and hard-wired electronic circuitry for measuring the frequency of the Doppler signal. The circuitry employs the "phase-locked-loop" principle for frequency determination, and utilizes a reference pulse generator for that purpose.

According to the present invention, rate-of-rise of the level of a liquid is determined in a reliable, accurate, and flexible manner. The rate-of-rise is determined without hard-wired electronic circuitry. This is accomplished, according to the present invention, by undertaking the determination of the Doppler frequency entirely by computer analysis of a signal from a microwave mixer/detector. Analysis of the signal by digital logic procedures within the computer ensures reliability and accuracy of the rate-of-rise calculated, and additional provides flexibility for additional data usage.

The method and apparatus according to the present invention are applicable to many procedures and environments, being applicable whenever the accurate control of level and filling or emptying rate is important. One possible application is the determination of the rate-of-rise of molten metal in a mold. A preferred specific application for the invention is in the measurement and control of the rate-of-rise of liquid steel and the filling of ingot molds by the bottom-pour technique.

In the practice of the method according to the invention, the information generated by the computer processing may be used in a real-time or time average display in analog or digital form to permit an operator to adjust metal flow to closely approximate a desired rate. The information may be compared over time with a predetermined plan of desired rate versus time, and the instantaneous or time average difference from the target may be displayed to permit appropriate operator action. Information on both actual and rate comparison to a predetermined plan may be recorded over the period of an entire metal handling operation for subsequent analysis and display. By summsation of the measured rate of level change data over a time period the absolute level change, and thus the instantaneous actual level, can be measured for display and/or recording. Also, the information concerning actual rate of change and/or comparison with a predetermined target and/or absolute level change and/or instantaneous actual level, may be used as an input to a control system for automatic actuation of flow devices with the objective of obtaining the desired values.

The basic processing steps for determining the rate-of-rise include transmitting a microwave signal of controlled wave lengths to the surface of the molten metal in the mold, and detecting a mixed microwave signal comprised of a signal reflected from the surface of the metal in the mold, and a transmitted signal, and producing an analog output signal proportional to the mixed signal detected. The analog output signal is converted to a digital signal. Processing by the computer is then utilized to filter the digital signal, determine the noise level in the filtered signal, continuously analyze the digital signal level to determine the time difference between different detected turn-around times, analyze the digital signal to eliminate the effects of spurious multiple-reflection microwave signals and disturbances in the surface of the molten metal in the mold, and calculate the rate-of-rise of the surface of the molten metal in the mold.

Apparatus according to the present invention comprises a container adapted to have molten metal therein, a mold, means for passing molten metal from the container to the mold, and a rate-of-rise determining means. The rate-of-rise determining means includes a microwave generator, and a microwave antenna located above the mold (and connected to the generator by a waveguide) for transmitting microwaves to the surface of the molten metal in the mold. Such means further comprise a mixer/detector operatively connected to the antenna, and computer means operatively connected to the mixer/detector. Monitoring and/or controlling means are operatively connected to the computer means.

It is the primary object of the present invention to provide an improved method and apparatus for controlling, or facilitating the control of, the rate-of-rise of the level of molten metal in a mold. This and other objects of the invention will become clear from an inspection of the detailed description of the invention, and from the appended claims.

BRIEF DESCRIPTION OF THE DRAWINGS

FIG. 3 is a computer printout displaying data collected during the practice of the present invention during the filling of an ingot mold by bottom-pouring.

DETAILED DESCRIPTION OF THE DRAWINGS

Figure 1:
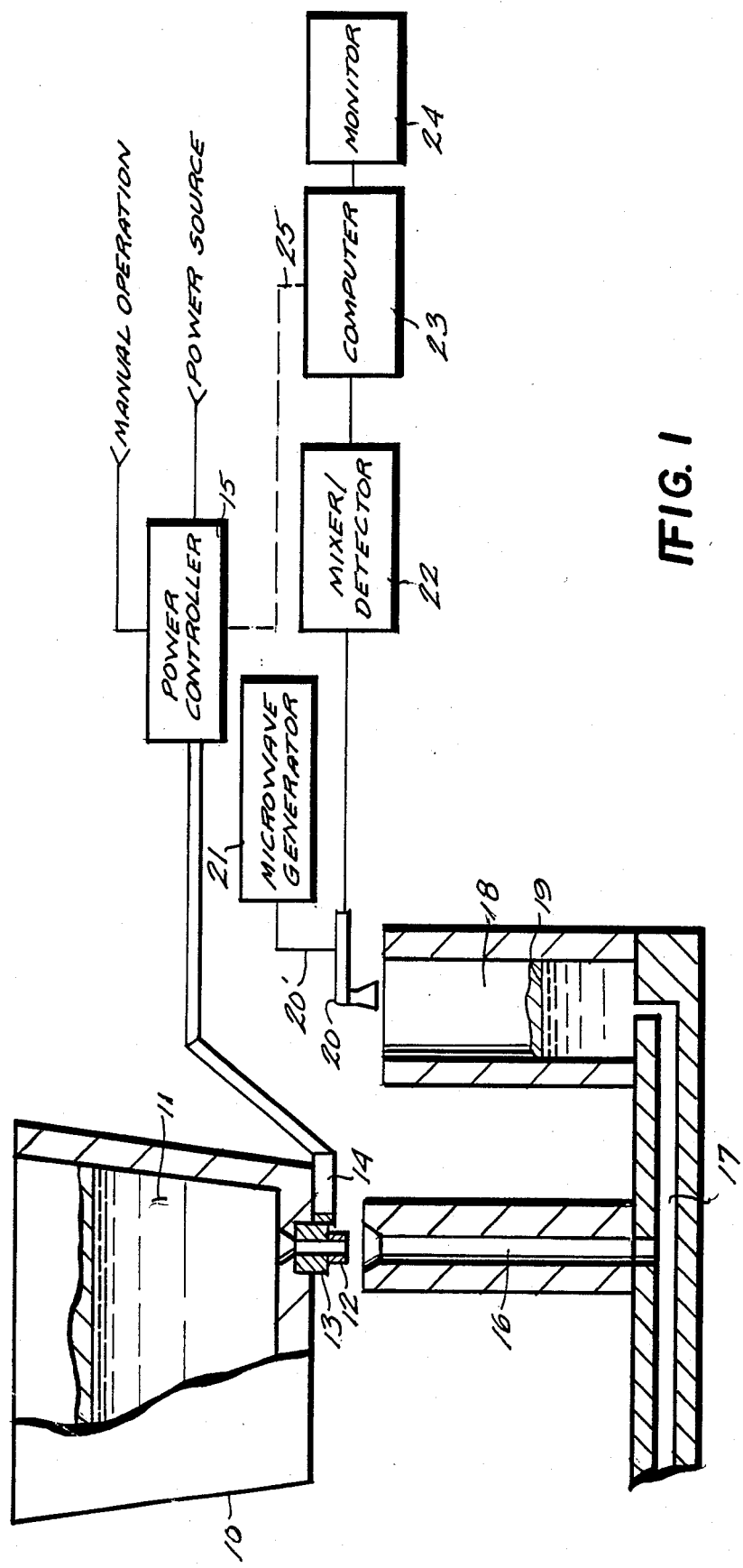
FIG. 1 is a side schematic view, partly in cross-section and partly in elevation, of exemplary apparatus according to the present invention.

Typical apparatus according to the present invention is illustrated schematically in FIG. 1. The apparatus illustrated therein is apparatus for the filling of ingot molds with liquid steel by the bottom-pour technique. The apparatus includes a ladle 10, or like container, adapted to contain molten metal 11, and having an orifice 12 in the bottom thereof. A valve, such as in the slide gate valve 13 in the preferred embodiment, is associated with the orifice 12, and comprises means for adjusting the flow of molten metal through the orifice 12. The slide gate valve 13 is adjustable to any position between a zero flow position, and a maximum flow position. Operation of the slide gate valve 13 is preferably provided by a motor driven gear 14 actuated by a power controller 15.

Molten metal 11 from container 10 flows through the orifice 12 to refractory lined channels 16, 17, and into the bottom of a mold cavity 18. According to the invention the rate-of-rise of the molten metal surface 19 in the mold 18 is measured and controlled. An antenna 20 transmits a microwave signal of a controlled wave length, which is supplied by a microwave generator 21, and the signal is directed to the surface 19. In order to remove the generator 21 from the adverse effects of heat rising from the mold 18, it is located to the side of the mold, and is connected to antenna 20 by a wave guide 20'. The antenna 20 may comprise any suitable conventional antenna such as a 17 dB horn antenna of brass construction. The generator 21 may also comprise any suitable conventional construction, such as an MA-87127-3 model frequency modulated transceiver sold under the trademark GUNNPLEXER by M/A-COM Gallium Arsenide Products, Inc. of Burlington, Mass.

Operatively connected to the antenna 20 is a microwave mixer/detector 22. The device 22 combines a sample of the transmitted signal and a signal reflected from the surface 19. The mixer/detector 22 produces an analog output signal proportional to the detected mixed signal.

Operatively connected to the mixer/detector 22 is a computer means 23. In the computer means the detected analog output signal is converted to a digital signal by an A/D converter board, and then is further acted upon to produce data and control signals related to the rate-of-rise of the surface 19 in the mold 18. For instance the computer may provide an output signal representing information on the instantaneous rate-of-rise, time average rate-of-rise, net distance of rise, and instantaneous metal surface position relative to the container. This information may be transmitted to a display monitor 24 and/or may pass through a suitable control line 25 directly to the power controller 15 to effect control thereof. An operator viewing the information on the monitor 24 may effect manual control of the power controller 15, or automatic control of the controller 15 is provided directly by line 25.

According to the invention the data may be retained in the memory of the computer means 23. For instance the rate-of-rise versus time, absolute level versus time, and a comparison of actual and pre-programmed desired rate and level information may be recorded. The data in the computer memory may then be accessed to create a non-volatile magnetic memory record. Data from the computer memory or the non-volatile magnetic memory can subsequently be displayed or printed out for review.

Figure 2:
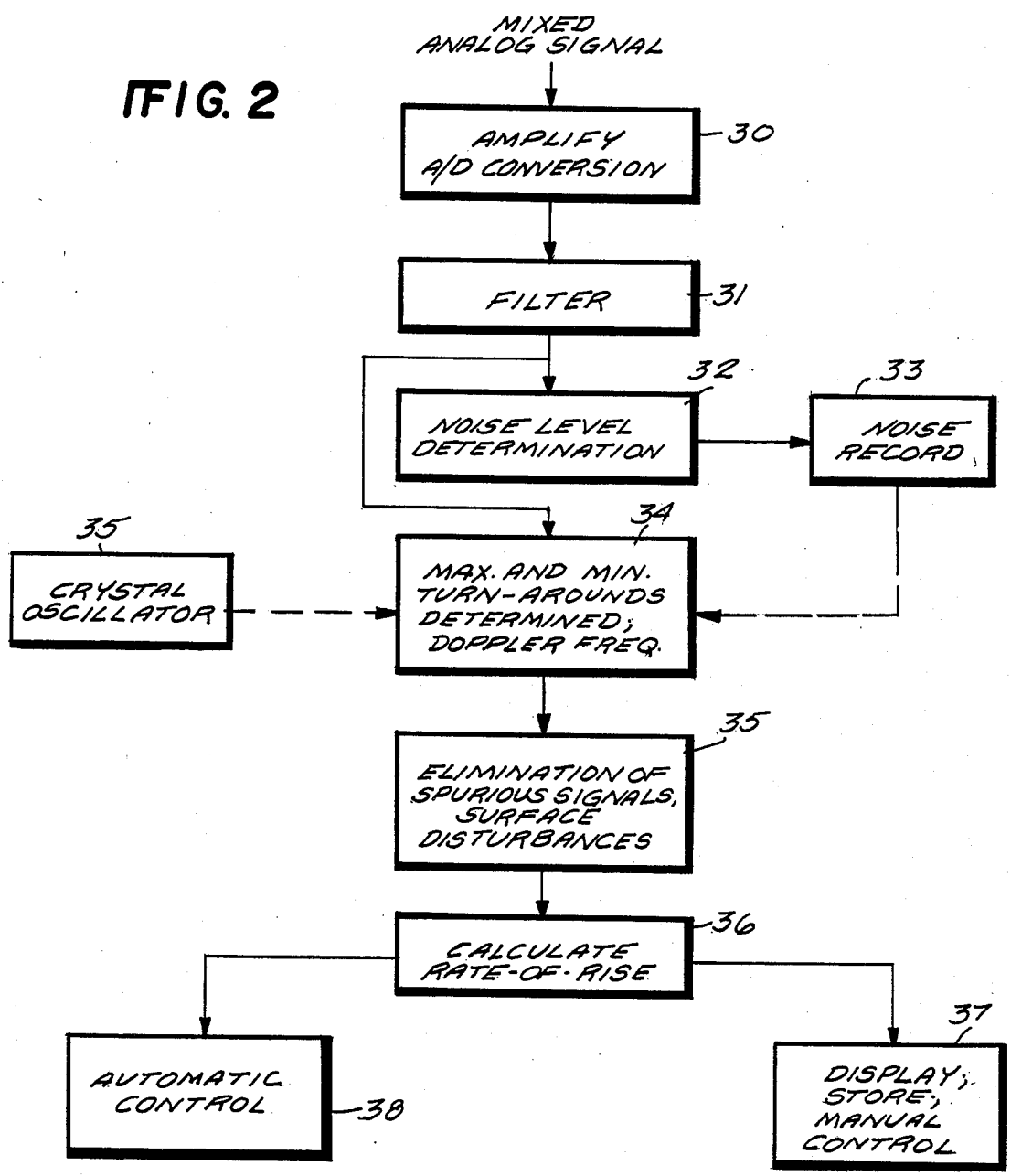
FIG. 2 is a schematic flow chart illustrating the practice of a method according to the present invention.
Figure 4:
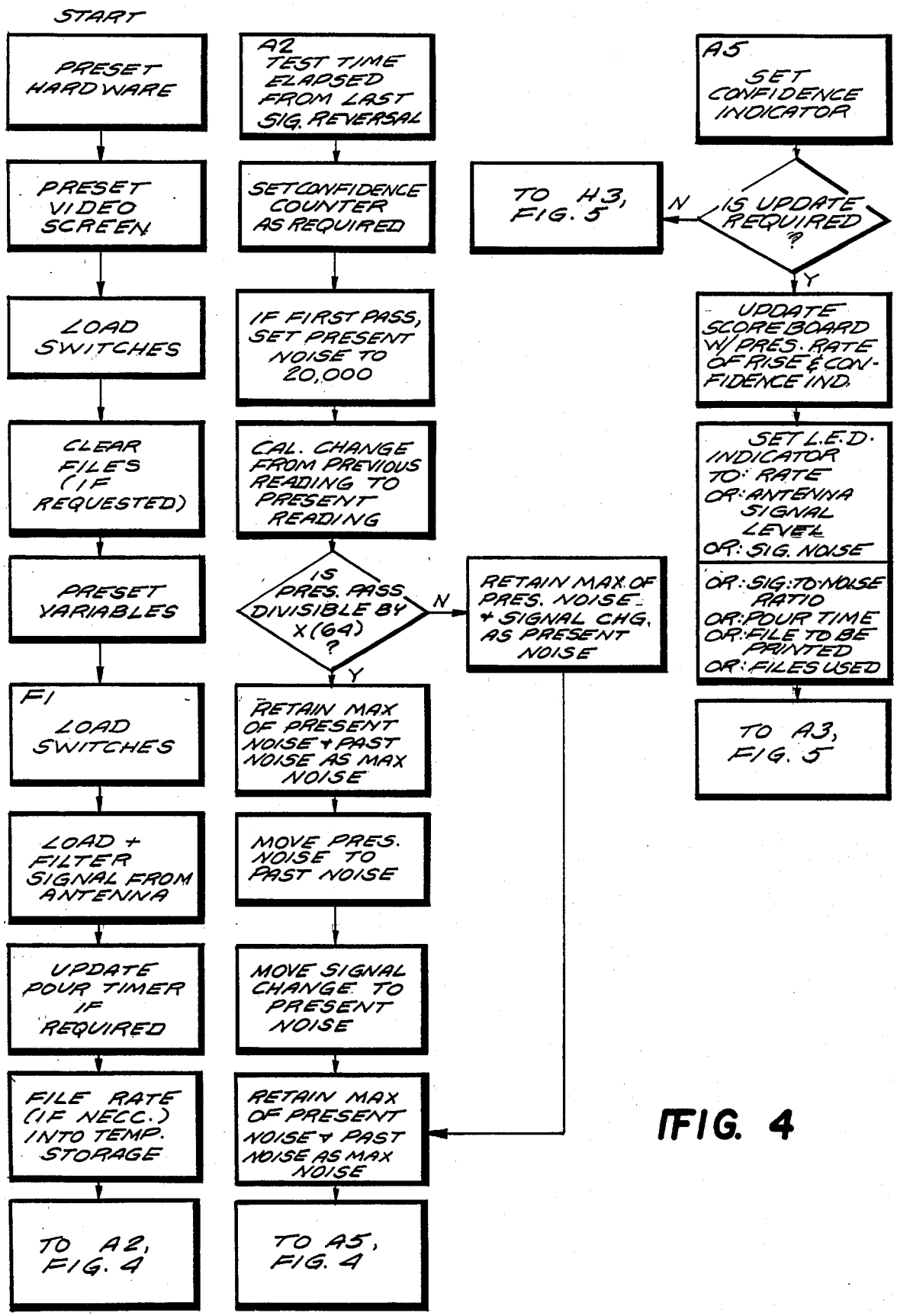
FIGS. 4–6 are detailed flow-charts illustrating an exemplary method according to the invention.
Figure 5:
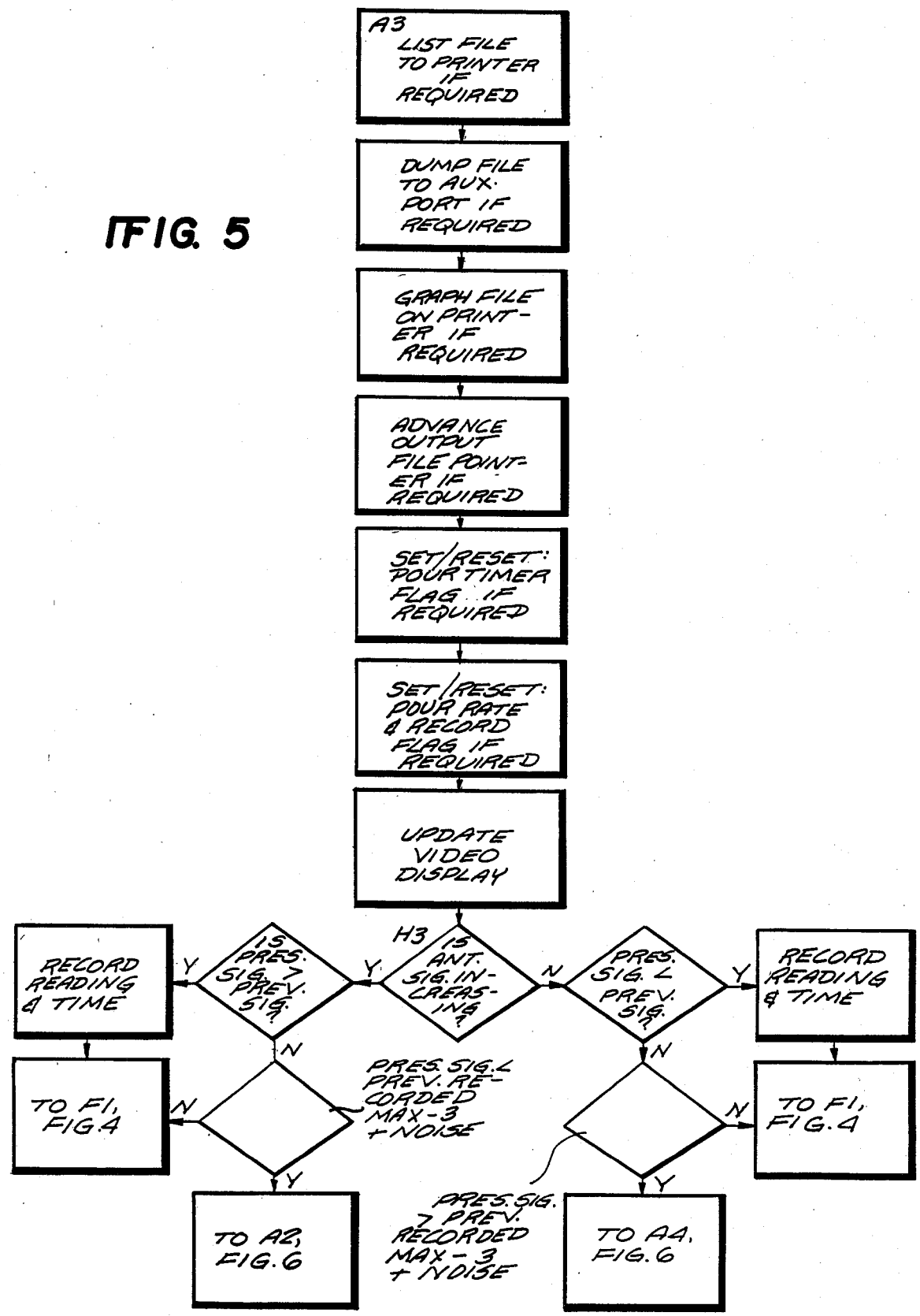
Figure 6:
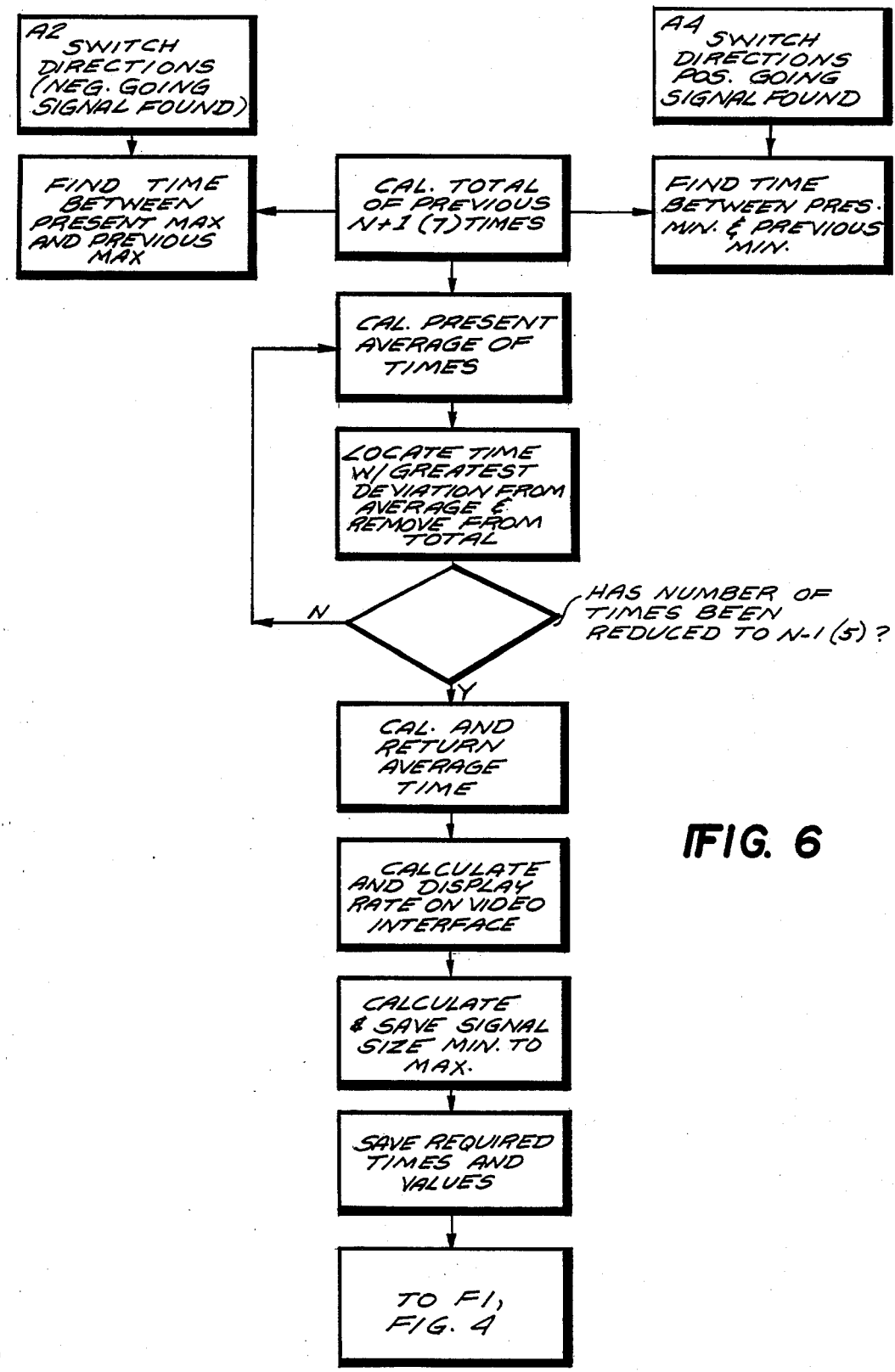

FIG. 2 provides a schematic flow chart illustrating the basic method procedures according to the present invention. The mixed analog signal from the mixer/detector 22 is amplified and converted to a digital signal (by an A/D converter board within the computer means 23) at step 30, and then is passed to the processing means, which practices all of steps 31+ in FIG. 2. The details of all of the processing steps are set forth in FIGS. 3 through 6, and a printout of the software is attached hereto as an appendix.

The filter step 31 is preferably accomplished by averaging a plurality of sequential digital readings (e.g. about 16). Then the latest reading is added and the earliest reading deleted, followed by re-averaging. The averaging and re-averaging procedures are repeated a plurality of time per second (e.g. about 60 times per second), and the resultant filtered signal (e.g. 60 readings per second) is passed onto step 32.

In step 32 the extraneous variation in amplitude—the "noise" level—is determined. This is preferably accomplished by examining all filtered amplitude readings over a three second, or comparable, time period, and determining the maximum range between consecutive values. This maximum range is the "noise level" and is passed to temporary memory storage 33 for subsequent comparison with signal data.

It is then necessary to determine the frequency of the signal. In the preferred embodiment, in step 34, the signal level is continuously analyzed to detect and record maxima and minima. When the signal level is increasing any signal level greater than the previous recorded level is recorded, together with the time that that level is reached. If a signal level lower than the previously recorded maximum level is detected, a "turn-around" is tested for by comparing the signal level with the previous maximum level minus "X" times the recorded and retained noise level from step 33. "X" is an adjustable parameter which can be set based upon experimentally determined requirements for a given application and with the particular antenna 20, generator 21, and A/D conversion equipment utillized. Typically X would be a value between about 2-6.

The "turn-arounds" measure the level of the standing wave, that is the Doppler frequency (the difference between the transmitting and received signals). Once a maximum turn-around is detected, the turn-around time is recorded and the decreasing signal level is tracked in the same way to detect a minimum turn-around. The minimum turn-around time is also recorded. The time between sequential maximums, or the time between sequential minimums, is then determined. Preferably all timing is accomplished by comparison with a pulse count of a crystal oscillator 35 internal to the computer means 23. It is preferable to determine minimum-to-minimum and maximum-to-maximum times rather than minimum-to-maximum times in order to maximize accuracy.

Alternately, the frequency of the signal may be determined by employing the time between crossings of the signal through its average value.

Before computing the rate-of-rise from the turn-around to turn-around timing, further analysis is made in order to eliminate the effects of spurious multiple-reflection microwave signals, and to eliminate the effects of disturbances to the surface 19. This is accomplished in step 35 as follows: each time a new turn-around to turn-around time is recorded, this time is added to the previous N values and an average N+1 values is computed. "N" is a positive integer. Typically N would be 6. The single value most divergent from this average is rejected, and the remaining N values are averaged. Again the most divergent value from the average of N values is rejected, and the average of N−1 values is determined. Further rejection and re-averaging may be practiced if desired. Ultimately this sequencing produces an optimized value.

Preferably, before calculating the optimized value, a pre-optimization procedure is undertaken. In the pre-optimization procedure Y values are examined wherein Y is a positive integer, and each value is compared with a preceding average value, rejecting any value which differs by more than Z percent from the previous average, until Y-P values have been selected, wherein P is also a positive integer. Each selected value is then passed to the optimization procedure. Typically Y would be 10, P would be 5, and $Y-P=N-1$. Z would typically be about 20 percent, but could vary anywhere between about 5 and about 50 percent.

Also, if desired, a rejected value from the pre-optimization procedure described above may be added to the immediately following value. The sum of these two values is within Z percent of the previous average, the sum is then accepted as a valid value and passed to the optimization procedure. If a value is accepted as a result of the summation procedure, analysis proceeds excluding the second value included in the summation.

The parameters N, Y, P, and Z may be set based upon historical and experimental data to provide the desired characteristics and sensitivity for a given application, and for a given generator 21, antenna 20, and A/D converter.

The optimized value from step 35 is utilized in calculation step 36 to calculate the rate-of-rise. The optimized value for turn-around to turn-around time, and the known microwave wave length readily provides for the calculation of distance per unit time. When the rate-of-rise is calculated, it may be displayed (step 37 in FIG. 2) utilizing the monitor 24. The operator may view the monitor 24 and effect manual control of the power controller 15 based upon what he/she perceives on the monitor 24. Alternatively, automatic control (step 38 in FIG. 2) can be practiced based upon the rate-of-rise calculations. Of course all of the calculations can be stored to be subsequently analyzed and utilized, as previously described.

FIG. 3 comprises a computer printout displaying data collected during a test run of the apparatus according to the present invention during the filling of an ingot mold by bottom-pouring. Column A gives the time in minutes. Column B is the time interval between each individual detected turn-around. Column C1 is the signal to noise ratio minimum, and Column C2 is the signal to noise ratio maximum. Column D1 gives the average rate-of-rise in inches per minute over a typical six inch vertical height of the mold 18. Column D2 gives the average rate-of-rise in inches per minute as determined after utilization of the procedural step 35, as described above, giving an optimized average over about two inches of vertical travel in the in the mold. The values in Column D2 are considered more accurate than those in D1.

The values set forth in FIG. 3 start after an equilibrium condition was achieved in the mold. Typically the first time reading would be at about one minute, with subsequent readings at approximately one minute intervals.

It will thus be seen that according to the present invention a method and apparatus have been provided for determination of the rate-of-rise of the level of molten metal in a mold in a reliable, accurate, and flexible manner. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and apparatus.

APPENDIX

```
                RATE OF RISE
                FOSECO, INC.
         PROTOTYPE USED APRIL 9, 1984
              BY: L.H. SCHWANKE

/* PROGRAM TO MEASURE AND DISPLAY RATE OF RISE */ define TIMER OXE3EO    /* timer location */ define PIA1A OXE3DO
     /*    IF SCORE BOARD    */
  /* DO-6 = 10's digit for score board */
  /* D7   = 100's digit for score board (one on or off) */
     /*    IF PRINTER        */
  /* DO-7 = printer data lines */
  /* CA1  = printer return */
  /* CA2  = printer send   */ define PIA1B OXE3D2
  /* DO-6 = 1's digit for score board */
  /* D7   = Confidence indicator for score board */
```

RATE OF RISE
FOSECO, INC.
PROTOTYPE USED APRIL 9, 1984
BY: L.H. SCHWANKE

```
#define PIA2B OXE3DA
  /* DO-D3 = data for led latchs */
  /* D4 = latch line for 1's digit on led */
  /* D5 = latch line for 10's digit on LED readout */
  /* D6 = latch line for 100's diget on LED readout */
  /* D7 = reserved */
  /* CB2 = indicator */ define PIA2A OXE3D8
  /* DO,D4-6 = driver for switch loading */
  /* D1-3 = mux Return for switch loading */
  /* CB2 = */

/*   switch mux
*/
/*           D7        D6        D5        D4
*/
/*   --------------------------------------------------------
*/

/* D3       advance   used      print                       */

/* D2       list      graph     transfer   (view)           */

/* D1       stop      start                erease           */

/* D0       reserved  */ define ACIA OXE3CO
define SPACE OX20
#define MASK OX3F
#define SCREEN OX8000    /* screen mem loc */
char *key_board;    /* pointer to key board */
int *timer_pnt;     /* pointer for timer registers */
char *timer_cnt;    /* pointer for timer control registers */
char key;           /* last key read from keyboard */ main ()
{
  int *p;  /* temp pointer */
  int reading;
  int edge;      /* present min or max reading depending on direction */
  int LastEdge;  /* previous edge level */
  int edge_time; /* time present edge was detected */
  int DelayTime; /* time from last crossing */
  int LastTime;  /* time of last min or max */
  int ConCtr;    /* min max dector counter */
  int premax;    /* time of previous max reading */
  int premin;    /* time of previous min reading */
  int preread;   /* previous reading */
  int sample;    /* number of present reading */
  int present_dir; /* present direction 1 moving pos  -1 moving neg */
  int e;         /* temp working array reference */
  int PkTime[16]; /* times of the previous 16 max readings */
  int PkNum;     /* number of times a max was detected */
  int SigNoise;  /* signal to noise ratio */
```

RATE OF RISE
FOSECO, INC.
PROTOTYPE USED APRIL 9, 1984
BY: L.H. SCHWANKE

```c
int max_noise;    /* max system noise */ int Rate;         /* present rate of rise in in/min */ int LastAvg;      /* last cal average */
int SigSize;      /* last max - last min levels */
int Temp;         /* temp storage for 2 or 3 lines only */
int Swt;          /* switch bit pattern */ int RamClock;
int PourClock;
int ClockFlag;
int RecordFlag;

char *ConfPort;
int Conf;         /* confidence indicator 1 true */
char *RecordInd;
char *EraseInd;

char *j;
sys_set();        /* setup system */
screen_set();     /* set up display */

Swt=SwtLoad();    /* Erase Mem */
if (Swt==256)
   {
   for ( p=0;p<0X4000;p=p+4)
      *p=0;
   }
ClockFlag=0;
RecordFlag=0;
PourClock=0;
RamClock=*(timer_pnt+1);

premax=0;
PkNum=0;

premax=0;
premin=0;
sample=0;
preread=0;
edge=0;
LastAvg=0;
present_dir=1;
key=32;
ConfPort=PIA2A+1;
Conf=0;
RecordInd=PIA1A+3;
EraseInd=PIA2A+3;
ConCtr=5;
LastTime=0;
while ( key!=209 )
   {
   Swt=SwtLoad();
   reading=get_ad();
```

RATE OF RISE
FOSECO, INC.
PROTOTYPE USED APRIL 9, 1984
BY: L.H. SCHWANKE

```
if ( RamClock-*(timer_pnt+1) > 300 )
  {
  RamClock=RamClock-300;
  if ( ClockFlag == 1 )
    PourClock++;
  } sample++;
DelayTime=LastTime-*(timer_pnt+1);
if (DelayTime>LastAvg<<1)
  ConCtr=5;
max_noise=noise_check(reading,sample);
if (max_noise<2)
  max_noise=2;
SigNoise=SigSize/max_noise;

if ((SigNoise < 5 ) || (max_noise>100)||(ConCtr>0))
  {
  *ConfPort=OX34; /* turn light off */
  Conf=0;
  }
else
  {
  *ConfPort=OX3C; /* turn light on */
  Conf=1;
  } if ((sample & OX1F) ==0)
  {
Score ( Rate/10,Conf);

switch (Swt)
  {
  case 16:
    Led ( PourClock>>1,1);
    break;

case 48:
    Led ( SigNoise,0 );
    break;

case 80:
    Led ( max_noise,0 );
    break;

case 144:
    Led ( (reading-100) >> 2 , 1 );
    break;

case 2048:
    *RecordInd = OX34;
    *EraseInd = OX34;
    RecordFlag=0;
    ClockFlag=0;
    Led ( Rate/10,1);
    break;
```

RATE OF RISE
FOSECO, INC.
PROTOTYPE USED APRIL 9, 1984
BY: L.H. SCHWANKE

```
    case 1024:
      *RecordInd = OX3C;
      RecordFlag=1;

case 512:
      *EraseInd = OX3C;
      ClockFlag=1;
      PourClock=0;

default:
      Led ( Rate/10,1 ) ;
    } display( Swt,14,3);
    display( SigNoise,11,3);
    Temp=sample>>4;
    display (Temp,10,4);
    if ( (sample & OX20) == 0 )
      display (max_noise,4,4);
    else
      display (reading,3,4);
    }
  if (max_noise<4000)
    {
    if (present_dir>0)
      {
      if (reading>edge)
        {
        edge=reading;
        edge_time=*(timer_pnt+1);
        }
      else
        {
        if (reading<edge-3*max_noise)
          {
          present_dir=-1;
          PkNum++;
          e=PkNum & OXF;
          PkTime[e]=premax-edge_time;
          display (PkTime[e],5,4);
          premax=edge_time;

LastAvg=(LastAvg+Average(PkTime,7,PkNum))/2;
          Rate=345680L/LastAvg;
          display(Rate,7,4);
          SigSize=edge-LastEdge;
          LastEdge=edge;
          LastTime=edge_time;
          if ( ConCtr > 0 )
            ConCtr--;
          }
        }
      }
  else
    {
```

RATE OF RISE
FOSECO, INC.
PROTOTYPE USED APRIL 9, 1984
BY: L.H. SCHWANKE

```
        if (reading<edge)
           {
           edge=reading;
           edge_time=*(timer_pnt+1);
           }
        else
           {
           if (reading>edge+3*max_noise)
              {
              present_dir=1;
              PkNum++;
              e=PkNum & 0XF;
              PkTime[e]=premin-edge_time;
              display (PkTime[e],6,4);
              premin=edge_time;

LastAvg=(LastAvg+Average(PkTime,7,PkNum))/2;
              Rate=345680L/LastAvg;
              display(Rate,7,4);
              SigSize=LastEdge-edge;
              LastEdge=edge;
              LastTime=edge_time;
              if ( ConCtr > 0 )
                 ConCtr--;

}
           }
        }
/*    key=*key_board; /* update data from keyboard port */ */
      }
   }
/*  provide a selected average */
Average(Array,size,PkNum)
int Array[],size,PkNum;
   {
   int TmpArray[16];
   int avg,i,j,k,l,n;
   long int total;
   for (i=0,j=0,total=0;i<size;i++)
      {
      k=(PkNum-i) & 0XF;
      TmpArray[i]=Array[k];
      if (TmpArray[i]>0)
         {
         total=total+TmpArray[i];
         j++;
         }
      }
   if (j>0)
      {
      avg=total/j;
      while (j>5)
         {
         for (i=0,k=0,l=0,n=0;i<size;i++)
            {
```

RATE OF RISE
FOSECO, INC.
PROTOTYPE USED APRIL 9, 1984
BY: L.H. SCHWANKE

```c
        if (TmpArray[i]>0)
          {
          l++;
          if (k<abs(TmpArray[i]-avg))
            {
            k=abs(TmpArray[i]-avg);
            n=i;
            }
          }
        }
      total=total-TmpArray[n];
      TmpArray[n]=0;
      j=l-1;
      avg=total/j;
      }
    }
  else
    {
    avg=total;
    }
  return(avg);
  }
/* find max noise over 2 time periods */
noise_check(reading,sample)
int reading;
int sample;
  {
  int j;
  int noise;  /* present difference between past & present reading */
  static int preread; /* previous reading */
  static int max_noise;/*max noise detected over previous 2 time periods */
  static int past_noise;/*max noise detected over the previous time period */
  static int present_noise;/*max noise detected durring present time period */
      if (sample==1)
        {
        present_noise=20000;
        }
      noise=abs(reading-preread);
      j=sample & 0X003F;
      if (0==j)/* setup time period for 64 readings */
        {
        max_noise=past_noise;
        past_noise=present_noise;
        max_noise=max(max_noise,past_noise);
        present_noise=noise;
        }
      else
        {
        present_noise=max(present_noise,noise);
        }
      max_noise=max(max_noise,present_noise);
      preread=reading;
      return(max_noise);
      }
```

RATE OF RISE
FOSECO, INC.
PROTOTYPE USED APRIL 9, 1984
BY: L.H. SCHWANKE

```c
/* screen set up */
screen_set()
  {
  char *j;
  for (j=SCREEN;j<SCREEN+6000;j++)
    *j=32;
  j="RATE OF RISE";
  moves (j,0,10);
  j="PRESENT READING";
  moves (j,3,16);
  j="NOISE";
  moves (j,4,16);
  j="MAX TIME";
  moves (j,5,16);
  j="MIN TIME";
  moves (j,6,16);
  j="RATE";
  moves (j,7,16);
  }
/* move string */
moves (p,l,h)
char *p;
int l;     /* line location */
int h;
  {
  int i;
  char *s;
  s=SCREEN+l*32+h;

for (i=0;*(p+i)!='\0';i++)
    *(s+i)=(*(p+i)&MASK);
  }
/* RETURNS INT AVERAGE OF 16 A TO D READINGS */
get_ad()
#define ATOD OXC800
#define COMP OX1000
#define SIG OXFFF
  {
  int i;
  unsigned sum_read;
  int *ptr_ad;
  int reader;
  int *s;
    ptr_ad=ATOD;
    sum_read=0;
    for (i=1;i<17;i++)
      {
      *ptr_ad=0;    /* start convertion */
      reader=*ptr_ad;

while ((reader&COMP)==0)
        reader=*ptr_ad;

reader=SIG&reader;
      sum_read=sum_read+reader;
      }
```

RATE OF RISE
FOSECO, INC.
PROTOTYPE USED APRIL 9, 1984
BY: L.H. SCHWANKE

```c
    reader=sum_read>>4;
  return (reader);
  }
/* PROGRAM TO PLACE INT ON SCREEN */
display (num,lin,h)
int num,lin,h;
  {
  char *s;
  int i;
    s=SCREEN+lin*32+h;
    iton (num,s);
    for (i=1;*(s+i)!=0;i++)
      *(s+i)=*(s+i)&MASK;
    for (i=i;i<7;i++)
      *(s+i)=SPACE;
  }
/* timer setup and preset of variables */
sys_set()
  {
  char *port;
timer_pnt=TIMER+2;
timer_cnt=TIMER;
*(timer_cnt+1)=0;
*timer_cnt=130;     /* set control reg 3 */
*(timer_cnt+1)=1;   /* set control reg 2 */
*timer_cnt=0;       /* set control reg 1 */
*(timer_pnt+2)=4999; /* set divide sys clock by 10000 (1/100 sec) */
*(timer_pnt+1)=-1;
*timer_pnt=-1;

port=PIA1A;
*(port+1)=0;
*port=0XFF;
*(port+1)=0X34;
*(port+3)=0;
*(port+2)=0XFF;
*(port+3)=0X34; /* CB2 drives record indicator */ port=PIA2A;
*(port+1)=0;
*port=0X0F;
*(port+1)=0X34;  /* CA2 drives confidence indicator */
*(port+3)=0;
*(port+2)=0XFF; /* set switch mux port */
*(port+3)=0X34; /* CB2 drives erease */
}

SwtLoad()
  /*  switch load settings */
  /*     2 = print */
  /*     4 = used */
  /*     8 = advance */
  /*    16 = VIEW (USE WITH FOR ) */
  /*    32 = transmit data (list of numbers */
  /*    48 = (ratio) */
  /*    64 = graph */
```

RATE OF RISE
FOSECO, INC.
PROTOTYPE USED APRIL 9, 1984
BY: L.H. SCHWANKE

```c
/*    80 = (noise) */
/*   128 = list */
/*   144 = (signal level) */
/*   256 = errease EEproms */
/*   512 = not used */
/*  1024 = start recording */
/*  2048 = stop recording */
  {
  unsigned l;
  char *Port;

Port = PIA2A;
  *Port=OX0D;
  l=*Port&OXF0;

*Port=OX0B;
  l=(1<<4)+(*Port&OXF0);

*Port=OX07;
  l=l+((*Port&OXF0)>>4);

return(OX0FFF-l);
  }
Led ( Num,DecPnt )

int Num,DecPnt;
  {
  char Sty[7],*Port;

Port=PIA2B;
  itoa (Num,Sty);
  while ( ( Sty[2] == 0 ) || ( Sty[1] == 0 ) )
    {
    Sty[2]=Sty[1];
    Sty[1]=Sty[0];
    Sty[0]=OX30;
    }
  *Port = ( Sty[2] & OX0F ) | OX60 ;
  *Port = *Port | OX70 ;
  *Port = ( Sty[1] & OX0F ) | OX50 ;
  *Port = *Port | OX70 ;
  *Port = ( Sty[0] & OX0F ) | OX30 ;
  if ( DecPnt == 1 )
    *Port = *Port | OX70 ;
  else
    *Port = *Port | OXF0 ;
  }
Score(Num,Conf)

int Num,Conf;
  {
  char String[7],*Point;
  int i,Seg;
  if (Num<0)
    Num=0;

if (Num>=200)
    Num=199;
  itoa ( Num,String );
```

RATE OF RISE
FOSECO, INC.
PROTOTYPE USED APRIL 9, 1984
BY: L.H. SCHWANKE

```
    while ( ( String[1]==0 ) || ( String[2] == 0 ) )
      {
      String[2]=String[1];
      String[1]=String[0];
      String[0]=0X30;
      }
   Point=PIA1A;
   i = String[2] & 0X0F ;
   Seg = Digit( i );
   if ( String[0] != 0X30 )
      Seg=Seg | 0X80;
    *Point = Seg ;
    Point = PIA1B ;
    i = String[1] & 0X0F ;
    Seg=Digit( i );
    if ( Conf==1 )
       Seg=Seg | 0X80;
    *Point=Seg;
    }
Digit ( Num )
int Num;
  {
  int Seg;
  switch (Num)
     {
     case 0:
        Seg=0X3F;
        break;
     case 1:
        Seg=0X06;
        break;
     case 2:
        Seg=0X5B;
        break;
     case 3:
        Seg=0X4F;
        break;
     case 4:
        Seg=0X66;
        break;
     case 5:
        Seg=0X6D;
        break;
     case 6:
        Seg=0X7D;
        break;
     case 7:
        Seg=0X07;
        break;
     case 8:
        Seg=0X7F;
        break;
     case 9:
        Seg=0X67;
     }
  return ( Seg );
  }
```

What is claimed is:

1. A method of determining the rate-of-rise of a liquid comprising the steps of:
   (a) transmitting a microwave signal of controlled wave length toward the surface of the liquid;
   (b) detecting a mixed microwave amplitude signal comprised of a signal reflected from the surface and said transmitted microwave signal, and producing an analog output signal responsive to the detected mixed signal;
   (c) converting the analog output signal to a digital signal;
   (d) filtering the digital signal;
   (e) determining the level of noise in the filtered signal;
   (f) continuously analyzing, with a digital signal processor, the digital signal in response to the determined noise level to determine Doppler frequency; and
   (g) calculating the rate of rise of the surface of the liquid in response to said determined Doppler frequency.

2. A method as recited in claim 1 further including the step of processing the digital signal to eliminate the effects of spurious multiple-reflection microwave signals and disturbances in the surface.

3. A method as recited in claim 1 wherein said step (f) includes the step of determining time differences between different detected turn-around times.

4. A method as recited in claim 3 wherein said time determining step is practiced by:
   recording any signal level greater than any previously recorded maximum signal level, together with the time that the level is reached;
   if a signal level lower than the previously recorded maximum level is detected, comparing the detected level with the previous maximum level minus X times the determined noise level, wherein X is an adjustable parameter, to provide a maximum turn-around;
   once the maximum turn-around is detected, storing the turn-around time;
   determining and storing a minimum turn-around time in the same manner as for a maximum turn-around time; and
   determining the time between consecutive maximum-to-maximum turn-around times and/or consecutive minimum-to-minimum turn-around times.

5. A method as recited in claim 4 further including the step of storing the noise level determined by step (e).

6. A method as recited in claim 4 wherein said turn-around time determining steps are accomplished by comparing time intervals between turn-arounds with a counter responsive to pulses produced by an oscillator.

7. A method as recited in claim 4 further including the following step of: on each occasion a new turn-around to turn-around time is determined, adding said time to the previous N determined turn-around times, wherein N is a positive integer; calculating an average of N+1 values; rejecting a value most divergent from this average, and then averaging the remaining N values; and rejecting the most divergent value from the average of N values, and calculating the average of N−1 values, and ultimately providing an average comprising an optimized value.

8. A method as recited in claim 7 comprising the further steps of, before determining the optimized value: undertaking a pre-optimization calculation by examining Y values, comparing each value with a preceding average value; and rejecting a value which differs by more than Z% from the previous average until Y−P values have been selected, wherein Y−P=N−1; and wherein Y, P, and Z are parameters that are based on experimental and historical data to provide desired characteristics and sensitivity.

9. A method as recited in claim 8 comprising the further steps of:
   adding a rejected value from said pre-optimization procedure to the immediately following value; and if the sum of these two values is within Z% of the previous average, accepting this sum as a valid value and passing it to said procedure for determining the optimized value.

10. A method as recited in claim 8 wherein N=6, Y=10, P=5, and Z is about 20%.

11. A method as recited in claim 3 wherein step (g) is practiced by utilizing said controlled wave length, and the time between consecutive maximum-to-maximum and minimum-to-minimum turn-arounds, to calculate rate-of-rise; and comprising the further step of displaying the calculated rate-of-rise calculations in inches/minute, or like readily discernible units.

12. A method as recited in claim 1 wherein step (e) is practiced by:
   examining all filtered amplitude readings over a 3 second period and determining the maximum range between consecutive values of such readings; and temporarily storing the maximum range determined.

13. A method as recited in claim 1 wherein step (d) is practiced by:
   averaging a plurality of sequential digital amplitude readings;
   adding the latest reading, and deleting the earliest reading, followed by re-averaging;
   and repeating said averaging and re-averaging procedures a plurality of times per second.

14. A method as recited in claim 13 wherein about 16 sequential digital readings of level are averaged in practicing step (d), and wherein the averaging and re-averaging procedures are repeated approximately 60 times per second.

15. A method of molding utilizing a mold, comprising the steps of:
   (a) placing molten metal into a container;
   (b) passing molten metal from the container into the mold, thereby causing the level of the surface of said molten metal in said mold to rise;
   (c) determining the rate-of-rise of the level of molten metal in the mold by:
      (i) transmitting a microwave signal to the surface of the molten metal in the mold;
      (ii) detecting a mixed microwave amplitude signal comprised of a signal reflected from the surface of the metal in the mold, and said transmitted microwave signal, and producing an analog output signal proportional to the mixed signal detected;
      (iii) converting the analog output signal to a digital signal;
      (iv) filtering the digital signal;
      (v) determining the level of noise in the filtered signal;
      (vi) continuously analyzing the digital signal, in response to said determined noise level, to detect turn-around points in said mixed signal and to determine time differences between said detected turn-around points;

(vii) further processing said detected time differences to eliminate the effects of spurious multiple-reflection microwave signals and disturbances in the surface of the molten metal in the mold; and (viii) calculating the rate of rise of the surface of the molten metal in the mold in response to said further processed time differences; and (d) adjusting the rate of metal flow in step (b) so that a desired rate of rise of molten metal level in the mold is achieved.

16. A method as recited in claim 15 wherein step (d) is practiced by operating a valve associated with a nozzle at the bottom of the container, to vary the amount of molten metal flowing from the container through the nozzle.

17. A method as recited in claim 15 wherein step (vi) is practiced by:

recording any signal level greater than any previously recorded maximum signal level, together with the time that the level is reached;

if a signal level lower than the previously recorded maximum level is detected, comparing the detected level with the previous maximum level minus X times the determined noise level, wherein X is an adjustable parameter, to provide a maximum turn-around;

once the maximum turn-around is detected, recording the turn-around time;

determining and recording a minimum turn-around time in the same manner as for a maximum; and determining the time between consecutive maximum-to-maximum times, or minimum-to-minimum times.

18. A method as recited in claim 17 further including the step of storing the noise level determined by step (v).

19. A method as recited in claim 17 wherein time determinations are accomplished by comparison with a pulse counter of an oscillator.

20. A method as recited in claim 17 wherein said analyzing step (vii) is practiced by:

on each occasion a new turn-around to turn-around time difference is determined, adding said new time difference to the previous N determined values of turn-around time differences, wherein N is a positive integer;

calculating an average of N+1 time difference values; rejecting a value most divergent from this calculated average, and then averaging the remaining N values;

rejecting the most divergent value from the calculated average of N values;

calculating the average of said remaining N−1 values;

an ultimately providing an average comprising an optimized time difference value.

21. A method as recited in claim 20 comprising the further steps of, before determining the optimized value: undertaking a pre-optimization calculation by examining Y values, comparing each value with a preceding average value; and rejecting a value which differs by more than Z% from the previous average until Y−P values have been selected, wherein Y−P=N−1; and wherein Y, P, and Z are parameters that are based on experimental and historical data to provide desired characteristics and sensitivity for a given apparatus utilized.

22. A method as recited in claim 21 comprising the further steps of:

adding a rejected value from said pre-optimization procedure to the immediately following value; and if the sum of these two values is within Z% of the previous average, accepting this sum as a valid value and passing it to said procedure for determining the optimized value.

23. A method as recited in claim 21 wherein N=6, Y=10, P=5, and Z is about 20%.

24. A method as recited in claim 17 wherein step (viii) is practiced by utilizing the wave length of said transmitted microwave signal, and the time between consecutive maximum-to-maximum or minimum-to-minimum turn-arounds, to calculate rate-of-rise; and comprising the further step of displaying the calculated rate-of-rise calculations in inches/minute, or like readily discernible units.

25. A method as recited in claim 15 wherein said noise level determining step (v) is practiced by:

examining all filtered amplitude readings over a 3 second period and determining the maximum range between consecutive values of such readings; and passing to temporary memory storage the maximum range determined.

26. A method as recited in claim 15 wherein step (iv) is practiced by:

averaging a plurality of sequential digital amplitude readings;

adding the latest reading, and deleting the earliest reading, followed by re-averaging;

and repeating said averaging and re-averaging procedures a plurality of times per second.

27. A method as recited in claim 26 wherein about 16 sequential digital readings of level are averaged in practicing step (iv), and wherein the averaging and re-averaging procedures are repeated approximately 60 times per second.

28. A method as recited in claim 15 wherein step (d) is practiced automatically in response to step (c).

29. Apparatus for determining the rate-of-rise of the level of a liquid comprising:

means for transmitting microwave signals toward the surface of the liquid;

means for detecting a mixed microwave signal comprised of a signal reflected from the surface of the liquid, and said transmitted signal, and for producing an analog output signal proportional to the mixed signal detected;

means connected to said detecting means for converting the analog output signal to a digital signal; and processing means connected to said converting means for: filtering the digital signal; determining the level of noise in the filtered signal; continuously analyzing the digital signal level and said determined noise level to determine Doppler frequency; and calculating the rate-of-rise of the surface of the liquid in response to said determined Doppler frequency.

30. Apparatus as recited in claim 29 wherein said processing means, in determining Doppler frequency, determines the time differences between successive detected turn-around times.

31. Apparatus as recited in claim 29 wherein said processing means also analyzes the digital signals to eliminate the effects of spurious multiple-reflection microwave signals and disturbances in the surface.

32. Apparatus as recited in claim 29 where said means for transmitting microwaves include a microwave generator and an antenna.

33. Apparatus for molding metal comprising:

a container adapted to have molten metal therein;
a mold;
means for providing passage of molten metal from said container to said mold to cause the surface of molten metal in said mold to rise;
means for determining the rate-of-rise of the level of molten metal in the mold, said means comprising: means coupled to said mold for transmitting microwave signals toward the surface of the molten metal in the mold; means coupled to the mold for detecting a mixed microwave signal comprised of a signal reflected from the surface of the metal in the mold, and said transmitted signal, and for producing an analog output signal proportional to the mixed signal detected; means connected to said detecting means for converting the analog output signal to a digital signal; and processing means connected to said converting means for: filtering the digital signal, determining the noise level in the filtered signal, continuously analyzing the digital signal level to determine the time differences between detected turn-around times, further analyzing the time differences to eliminate the effects of spurious multiple-reflection microwave signals and disturbances in the surface of the molten metal in the mold, and calculating the rate of rise of the surface of the molten metal in the mold in response to said further analyzed turn-around time differences; and
means connected to said determining means for adjusting the amount of molten metal passing from said container to said mold in response to said calculated rate-of-rise to achieve a desired rate-of-rise.

34. Apparatus as recited in claim 33 wherein said means for providing passage from said container to said mold comprises an orifice, and wherein said adjusting means comprises an adjustable slide gate in said orifice.

35. Apparatus as recited in claim 33 wherein said means for transmitting microwaves include a microwave generator and an antenna.

36. Apparatus for molding molten metal comprising:
a container adapted to have molten metal therein;
a mold;
means for passing molten metal from said container to said mold;
a microwave generator for generating microwave signals;
microwave antenna means connected to said generator and coupled to said mold for transmitting microwave signals to the surface of the molten metal in said mold and for receiving microwave signals reflected by said molten metal surface;
mixer/detector means, operatively connected to said antenna means, for detecting the Doppler signal caused by changes in distance between said molten metal surface and said antenna means;
sampling means, connected to said mixer/detector means, for continuously sampling said Doppler signal;
signal processing means, connected to said sampling means, for determining the occurrences of maxima and minima in said sampled Doppler signal, and for calculating rate-of-rise of said molten metal surface in response to the time intervals between successive maxima and/or minima; and
controlling means operatively connected to said signal processing means and to said passing means, for controlling said passing means to adjust said molten metal surface rate-of-rise in response to said calculated rate-of-rise.

37. Apparatus as recited in claim 36 wherein said signal processing means includes an internal crystal oscillator for generating timing pulses.

38. Apparatus as recited in claim 36 further comprising a waveguide connecting said microwave generator and said antenna means, said generator located to the side of said mold remote from heat rising up from the mold.

39. Apparatus for determining the rate of change of the surface level of material within a container, said apparatus including:
radio frequency signal transmitting means for transmitting a radio frequency signal toward said material surface;
radio frequency detecting means, coupled to receive said radio frequency signal transmitted by said transmitting means and radio frequency signals reflected by said material surface, for producing an output signal responsive to the standing wave propagating between said transmitting means and said material surface;
sampling means connected to said detecting means for periodically sampling said output signal at a sampling frequency which is large relative to the frequency of said standing wave; and
signal processing means, connected to said sampling means, for determining the occurrences of minima and/or maxima of said standing wave in response to said sampled output signal, for determining the time intervals between said minima and/or maxima occurrences, and for calculating the rate of change of the level of said material surface in response to said determined time intervals.

40. Apparatus as in claim 39 wherein said signal processing means is preprogrammed so as to perform the following functions:
(a) calculate a series 1 to N+1 of rolling average values of said sampled output signal;
(b) determine the minimum range of a plurality of calculated average values;
(c) compare the magnitude of successive average values in said series;
(d) if said comparison reveals (1) the magnitude of an average value N+1 is less than the magnitude of the preceding average value N in said series and (2) the magnitude of said preceding average value N exceeds the magnitude of the next preceding average value N−1 in said series, further compare said magnitude of said average value N+1 with the magnitude of said average value N as corrected for noise in response to said determined maximum range; and
(e) determine said average value N represents the occurrence of a minimum or maximum of said standing wave if said further comparison reveals the magnitude of said average value N is less than said noise-corrected magnitude.

41. Apparatus as in claim 40 wherein said signal processing means determines the time intervals between successive minima, determines the time intervals between successive maxima, and calculates said rate of change in response to said determined intervals between minima and determined intervals between maxima.

42. Apparatus as in claim 39 wherein said signal processing means also calculates a rolling average of a plurality of successive time intervals, rejects at least one determined time interval most divergent from said calculated rolling average, recalculates said rolling average of said remaining determined time intervals, and calculates said rate-of-rise in response to said recalculated rolling average.

43. Apparatus for determining the rate of change of the surface level of molten metal within a container, said apparatus including:

radio frequency transmitting means for transmitting a radio frequency signal toward said molten metal surface;

radio frequency detecting means, coupled to receive said radio frequency signal transmitted by said transmitting means and also coupled to receive reflections of said transmitted radio frequency signal reflected by said molten metal surface, for producing an output signal responsive to the Doppler signal caused by change in said molten metal surface level;

sampling means connected to said detecting means for continuously sampling said output signal; and signal processing means connected to said sampling means for determining the occurrences of minima and/or maxima of said output signal, for determining the time intervals between minima and/or maxima, and for calculating the rate of change at the level of said molten metal surface in response to said determined time intervals.

44. Apparatus as in claim 43 wherein said signal processing means is preprogrammed so as to perform the following functions:

(a) calculate a series 1 to N+1 of rolling average values of said sampled output signal;

(b) determine the maximum range of a plurality of said calculated average values;

(c) compare the magnitude of successive average values in said series;

(d) if said comparison reveals (1) the magnitude of an average value N+1 is less than the magnitude of the preceding average value N in said series and (2) the magnitude of said preceding average value N exceeds the magnitude of the next preceding average value N−1 in said series, further compare the magnitude of said average value N+1 with the magnitude of said average value N as corrected for noise in response to said determined maximum range; and (e) determine said average value N represents the occurrence of a minimum and/or maximum of said sampled output signal if said further comparison reveals the magnitude of said average value N is less than said noise-corrected magnitude.

45. Apparatus as in claim 43 wherein said signal processing means also calculates a rolling average of a plurality of successive time intervals, rejects at least one determined time interval most divergent from said calculated rolling average, recalculates said rolling average of said remaining time intervals, and calculates said rate-of-rise in response to said recalculated rolling average.

46. Apparatus as in claim 43 wherein said signal processing means determines the time intervals between successive minima, determines the time intervals between successive maxima, and calculates said rate of change in response to said determined intervals between minima and determined intervals between maxima.

* * * * *